US011940102B2

(12) United States Patent
Anderson et al.

(10) Patent No.: US 11,940,102 B2
(45) Date of Patent: Mar. 26, 2024

(54) COLD STORAGE SYSTEM

(71) Applicant: Carver Enterprises, Inc., Jefferson, GA (US)

(72) Inventors: T. Carver Anderson, Maysville, GA (US); Tao Fang, Suwanee, GA (US); Croix Snapp, Duluth, GA (US); Mostafa Ghiaasiaan, Atlanta, GA (US)

(73) Assignee: Carver Enterprises, Inc., Jefferson, GA (US)

( * ) Notice: Subject to any disclaimer, the term of this patent is extended or adjusted under 35 U.S.C. 154(b) by 14 days.

(21) Appl. No.: 17/170,612

(22) Filed: Feb. 8, 2021

(65) Prior Publication Data

US 2022/0252221 A1 Aug. 11, 2022

(51) Int. Cl.
*F17C 5/00* (2006.01)
*F17C 13/00* (2006.01)

(52) U.S. Cl.
CPC .............. *F17C 5/00* (2013.01); *F17C 13/001* (2013.01); *F17C 2203/0391* (2013.01); *F17C 2221/013* (2013.01); *F17C 2221/014* (2013.01); *F17C 2223/0176* (2013.01)

(58) Field of Classification Search
CPC .. F17C 5/00; F17C 13/001; F17C 2203/0391; F17C 2221/013; F17C 2221/014; F17C 2223/0176; F17C 11/00; F25D 9/00; F25D 2303/0842; F25D 2303/085; F25D 2400/28; F25D 2400/30; F25D 3/10; F25D 3/12
See application file for complete search history.

(56) References Cited

U.S. PATENT DOCUMENTS 3,393,152 A * 7/1968 Smith ....................... C09K 5/04 62/54.3
4,625,753 A * 12/1986 Gustafson ................. F17C 5/02 62/50.7
5,135,553 A * 8/1992 Rebhan ................... C01B 32/55 62/46.1
5,368,105 A 11/1994 Chaiken et al.
(Continued)

FOREIGN PATENT DOCUMENTS

DE 195 18 344 A1 11/1995
FR 2 315 290 A1 1/1977
(Continued)

OTHER PUBLICATIONS

WO International Search Report & Written Opinion, Application No. PCT/US2022/015566, dated May 17, 2022.
(Continued)

*Primary Examiner* — Miguel A Diaz
*Assistant Examiner* — Ibrahim A. Michael Adeniji
(74) *Attorney, Agent, or Firm* — Orrick, Herrington & Sutcliffe LLP

(57) ABSTRACT

Systems and apparatus for providing long-term cold storage of solid materials such as dry ice are disclosed. The solid materials are stored in a tank configured to maintain the materials in their solid state. The tank is designed with a port sufficiently large to facilitate ingress and egress of the solid materials. A cryogenic liquid is used within the tank to substantially prevent the solid materials from sticking to each other, and to maintain the solid materials at a low temperature.

3 Claims, 5 Drawing Sheets

(56) References Cited

U.S. PATENT DOCUMENTS

| | | | | |
|---|---|---|---|---|
| 6,655,156 | B1 * | 12/2003 | Miksic | F17C 1/00 62/48.1 |
| 7,467,666 | B2 | 12/2008 | De Mange et al. | |
| 7,484,567 | B2 | 2/2009 | Demange et al. | |
| 7,631,506 | B2 | 12/2009 | Du Brucq | |
| 8,935,930 | B2 * | 1/2015 | Cousin | A23G 9/06 62/64 |
| 9,513,155 | B2 * | 12/2016 | Harper | G01F 23/26 |
| 10,837,692 | B2 | 11/2020 | Moon et al. | |
| 2002/0157402 | A1 * | 10/2002 | Drube | F17C 9/00 62/50.1 |
| 2006/0283977 | A1 | 12/2006 | Macdonald | |
| 2007/0160750 | A1 | 7/2007 | De Mange et al. | |
| 2008/0134693 | A1 * | 6/2008 | Harper | F17C 1/12 62/50.7 |
| 2017/0175951 | A1 * | 6/2017 | Morgan | F17C 1/06 |
| 2018/0010839 | A1 * | 1/2018 | Zhou | F25D 3/125 |

FOREIGN PATENT DOCUMENTS

| | | | | |
|---|---|---|---|---|
| WO | WO 99/34692 A1 | 7/1999 | | |
| WO | WO 2004/042295 A1 | 5/2004 | | |
| WO | WO-2004042295 A1 * | 5/2004 | | F25D 3/00 |

OTHER PUBLICATIONS

Kim, Ann G., et al., "Cryogenic Slurry Method to Extinguish waste Bank Fires," Proceedings America Society of Mining and Reclamation, DOI:10,21000/JASMR94040129, pp. 129-138 (1994) https://doi.org/10.21000/JASMR94040129.

* cited by examiner

COLD STORAGE SYSTEM

FIELD

The present disclosure relates generally to storage of cold materials and more particularly, but not exclusively, to systems and methods for long-term storage of dry ice and other cold solid materials, using a cryogenic tank and a cryogenic liquid such as liquid nitrogen.

BACKGROUND

Cold solids such as dry ice (solid carbon dioxide) are useful in a wide variety of emergency applications, such as fighting fires, containing hazardous material spills, slowing or containing flood waters, and many other applications where it is useful to deploy a rapid drop in temperature, as well as a rapid decrease in the oxygen environment. Dry ice is also particularly useful for a variety of industrial applications, such as blast cleaning, as well as customer applications such as rapidly cooling food and beverages.

These emergency and industrial applications for dry ice depend on having a large and readily-available supply of dry ice on short notice. For example, if a fire breaks out, it is desirable to have an immediately available supply of dry ice, in sufficient quantities to fight the fire. Similarly, if a hazardous material spills, particularly a liquid material, it is desirable to have an immediately available supply of dry ice, sufficient to contain (i.e., freeze) the spill. Containing flood waters is another use where an immediately available quantity of dry ice, sufficient to freeze the flood waters, is desirable.

Traditionally, dry ice is manufactured using large, complicated and expensive machines, so it is impractical to manufacture the dry ice on demand, especially at the site where the dry ice is needed (e.g. at a fire, or hazardous material spill site, or the like). Thus, traditional dry ice manufacturers house the dry ice manufacturing equipment in geographically-distributed hubs, and deliver dry ice from these hubs to the surrounding region.

However, traditional systems for storing dry ice and other cold solids do not provide acceptable storage duration. Thus, it is impractical for these manufacturers to manufacture a large quantity of dry ice and store it long term, even at their hubs. Instead, a customer desiring a large quantity of dry ice must contact the manufacturer several days before the customer actually needs the dry ice, in order to ensure that the manufacturer is able to manufacture and deliver a sufficient quantity of dry ice to satisfy the customer's need. However, as dry ice absorbs heat from the environment, it sublimates into gaseous carbon dioxide. Thus, even if the manufacturer is able to manufacture sufficient dry ice, traditional storage systems such as an insulated cooler wrapped in cellophane are inefficient, losing between 5-10% per day of the volume of dry ice. Thus, using traditional storage systems the dry ice entirely sublimates within 10-12 days of manufacture. This dry ice loss increases expenses for the customers, and reduces availability of the dry ice for emergency use. This is particularly problematic for retail customers, such as grocery stores, who must constantly replenish their supply of dry ice, for example on a weekly basis, even if the grocery store customers do not purchase all of the dry ice.

Because of the problem of sublimation of dry ice during shipping, traditional dry ice manufacturers ship the dry ice in large blocks. This reduces the surface area per unit volume of the dry ice, which reduces the sublimation loss rate. However, for many uses, it is desirable to store and deliver the dry ice in smaller sized units, such as pellets, so that the dry ice is able to more rapidly transfer cold temperature to the surrounding environment. For example, when fighting a fire it is desirable for the dry ice to sublimate quickly, so that the temperature of the fire is rapidly reduced and the oxygen environment is rapidly depleted. Similarly for containing hazardous materials or flood waters, it is desirable to rapidly transfer cold temperatures from the dry ice to the material being contained. For these uses, the customer must break up the large blocks of shipped dry ice into the smaller sizes desired. This additional processing of the dry ice increases the time and costs to the customer, and further depletes the dry ice due to additional sublimation.

In addition to losing volume, the quality of the dry ice degrades relatively rapidly over time. The sublimation process causes the dry ice to develop hard clumps, which are undesirable for emergency or industrial uses. With traditional dry ice storage systems, these hard clumps must be manually broken up before the dry ice is useable. Again, this additional processing of the dry ice increases the time and costs to the customer, and further depletes the dry ice due to additional sublimation.

Traditional storage systems for dry ice also fail to preserve a moisture-free environment around the dry ice. This causes the water moisture to freeze onto the dry ice, which causes pellets of dry ice to stick to each other and to anything else the dry ice pellets come into contact with. This sticking further complicates efficient storage of the dry ice pellets, as they must be separated from each other and their surrounding environment prior to being used. Once again, this additional processing of the dry ice increases the time and costs to the customer, and further depletes the dry ice due to additional sublimation.

In view of the foregoing, a need exists for an improved system and method for storing and delivering cold solids such as dry ice, in an effort to overcome the aforementioned obstacles, challenges and deficiencies of conventional storage and delivery systems.

Figure 1:
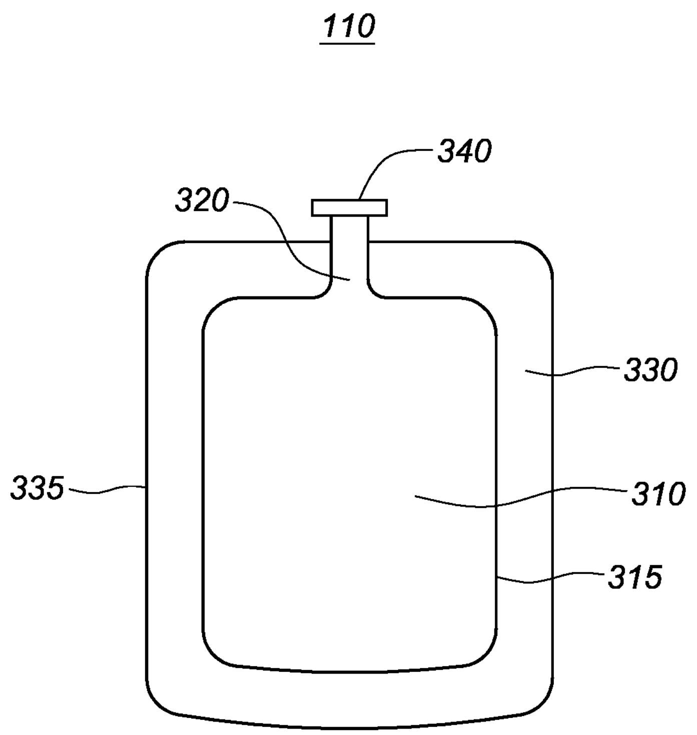
FIG. 1 is a depiction of a vertically-oriented cold material storage tank, according to an exemplary embodiment.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Figure 2:
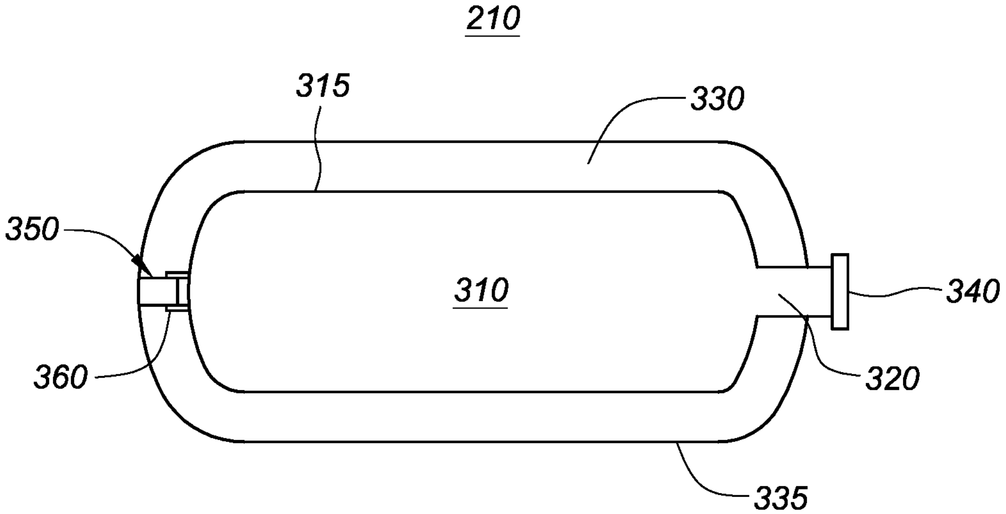
FIG. 2 is a depiction of a horizontally-oriented cold material storage tank, according to an exemplary embodiment.

Since currently-available storage and conveyance systems for cold solids such as dry ice perform poorly, fail to preserve the volume or quality of the stored materials, and do not provide the materials in the configurations desired by customers, a system and method for long term storage of cold solids can prove desirable and provide a basis for a wide range of emergency and industrial applications, such as fighting fires, containing hazardous material spills or flood waters, as well as improve consumer expectations and allow retail establishments to store and deliver dry ice more efficiently. This result can be achieved according to one embodiment disclosed herein, by a cold solid storage system as illustrated in FIGS. 1-3. For ease of explanation, the example embodiments disclosed herein pertain to storage and delivery of dry ice, but a person of skill in the art will appreciate that these systems and methods would apply to a wide variety of other cold solid materials, such as water ice, flash-frozen foods, seeds, etc., and particularly to materials which are in a solid state at temperatures below about −100 degrees Fahrenheit, but which transition to a liquid or gaseous state at temperatures above −50 degrees Fahrenheit.

Turning to FIG. 1, a storage system 100 of an embodiment of the invention can comprise a cold storage tank 110 that contains the dry ice used in the system 100, stored for example as pellets up to 6 inches in their largest dimension, such as commercial blasting dry ice pellets, or other standard commercially available pellets (which are typically cylindrical pellets measuring between ⅛ to ¾ inches in diameter, and between 4 and 6 inches in length). The specific dimensions of the dry ice pellets can vary widely depending on the end user's applications for using the dry ice pellets stored according to embodiments of the invention.

This tank 110 includes a storage space 310, coupled to a port 320 which allows access to and egress from the storage space 310. The storage space 310 and port 320 are defined by an inner wall 315. The tank 110 further includes a vacuum layer 330, configured to deter external temperatures from affecting the contents in storage space 310. The vacuum layer 330 is defined by the inner wall 315 and an outer wall 335. The outer wall 335 is disposed a sufficient distance away from the inner wall 315 to provide a sufficient vacuum space to deter heat exchange between the storage space 310 and the external environment. The vacuum layer 330 is kept at a partial vacuum pressure. A perfect vacuum pressure, zero Torr, is not required, though the lower the vacuum pressure in the vacuum space the more effective the tank will be at deterring heat exchange. Partial vacuums below approximately $10^{-2}$ Torr are generally sufficient to deter heat exchange. The port 320 can be sealed or covered by a seal 340, for example a stainless steel flange. The port is preferably configured to connect to the other components of the system as discussed below, including piping or a screw conveyor to facilitate egress and ingress of the solid material (e.g. dry ice pellets).

Turning now to FIG. 2, a view of a tank 210 is shown. Similar to the tank 110, this tank 210 includes a storage space 310, port 320, vacuum layer 330 and seal 340. Because the tank 210 is disposed horizontally, it additionally includes a support 350 attached to the outer wall 335. In this embodiment, the support 350 engages with a plurality of detents 360, to hold the inner wall 315 in a spaced-apart relationship with the outer wall 335 and deter the force of gravity from otherwise pulling the inner wall 315 undesirably close to the outer wall 335, causing undesirable heat exchange.

Figure 2A:
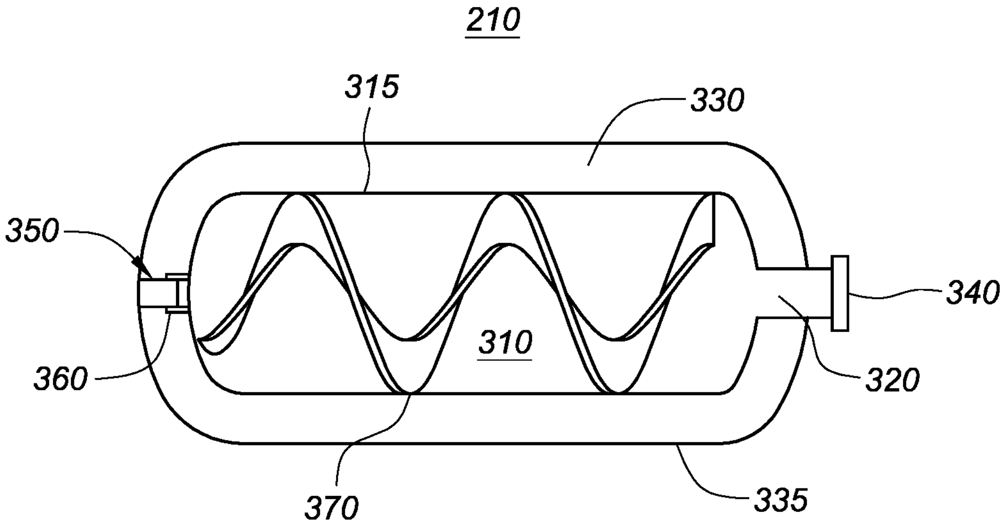
FIG. 2A is a depiction of an exemplary embodiment of a horizontally-oriented cold material storage tank having a plurality of pitched protrusions.

In an alternative embodiment shown in FIG. 2A, the tank 210 can further include a plurality of protrusions 370 extending inwardly from the inner wall 315 into the storage space 310. These protrusions 370 are pitched towards the port 320, such that when the tank 210 is rotated about an axis extending through the port 320 and the end of the tank opposite the port 320, the pitched protrusions 370 cause the contents of the tank 210 (e.g. dry ice pellets) to be urged towards the port 320. The protrusions 370 can be configured such that the tank contents are expelled out through the port 320, or alternatively such that the contents are merely urged towards the port 320 where another extraction mechanism can extract the contents from the tank 210. These protrusions 370 are also able to break up the contents of the tank 210 where those contents tend to stick to each other, such as discussed herein with respect to dry ice pellets.

The tank 110, 210 can be constructed in a wide variety of sizes, as suitable for the particular needs of the systems 100, 200. Thus many of the dimensions of the tank 110, 210 are design choices for those of skill in the art, and not critical to the embodiments of the invention. There are, however, certain preferable dimensions for tanks of embodiments of the invention. Preferably, the distance between the inner wall and the outer wall of tanks 110, 210 creates a vacuum layer that is sufficient to substantially deter heat exchange between the inner wall and the outer wall. Preferably, the port 320 is sufficiently large to facilitate the ingress and egress of solid dry ice pellets, which in embodiments are about 4 to 6 inches in the largest dimension. Thus, the port 320 of such embodiments is preferably about 0.25 to 1 inches larger than the largest dimension of the solid material being ingressed or egressed. Alternatively, the port 320 is sized to allow a conveyance system such as a screw conveyor or a pumping hose to be inserted into the port 320.

Conventional vacuum-walled storage tanks are designed to store liquids and gasses. Because the majority of heat exchange in any such tank occurs at the port 320, where the inner wall 315 contacts the outer wall 335 and provides a vacuum-free path for heat exchange, conventional tanks are designed to have as small an opening as possible. This is not a problem when the contents are gasses or liquids, but when it is desired to store solids in the tanks, the opening must be large enough to allow the contents to be inserted and removed from the tank. Thus, conventional vacuum storage tanks are not generally suitable for storage of cold solid materials.

Because the tanks 110, 210 are adapted to facilitate the ingress and egress of solid dry ice pellets, the tanks 110, 210 are susceptible to heat exchange through the port 320. Conventional cold storage tanks, used to store cold gasses and liquids, have a substantially smaller sized port, and thus these tanks are less susceptible to undesirable heat exchanges. However, these conventional tanks are incapable of containing cold solids such as dry ice pellets, because of the smaller-sized ports they use.

Storing cold solids such as dry ice, particularly for long periods of time, often causes the dry ice pellets to adhere to each other over time, as the dry ice in the pellets starts to sublimate and then re-freeze when in contact with adjacent pellets, or as the pellets pull trace amounts of water vapor from the atmosphere inside the tank 110, 210. To mitigate this undesirable effect and increase the storage life of the contents of the storage area 310 of tanks 110, 210, the storage area 310 is filled with a mixture of the solid contents (such as dry ice pellets) and a cryogenic liquid such as liquid nitrogen. The liquid nitrogen liquid will not meaningfully react with the dry ice pellets, so undesirable sticking of the pellets together will be substantially mitigated. The liquid nitrogen will also facilitate preservation of a low temperature in the storage area 310. This lower temperature will further deter the dry ice pellets from sublimating, and thus further increases the useful storage life of the dry ice pellets. Furthermore, mixing liquid nitrogen in with the dry ice pellets will facilitate extraction of the pellets from the tank 110, 210, using a propellant or suction system, as discussed below. The liquid nitrogen provides sufficient viscosity to the mixture that such systems are able to extract the mixture, because the liquid nitrogen physically carries the solid dry ice pellets out of the tank, upon application of a suction force to the storage area 330.

It is also desirable to maintain the pressure within the storage space 310 of tanks 110, 210 at a sufficient pressure range to prevent the contents of the tank 110, 210 from changing state. For example, where the contents are dry ice pellets, a pressure of less than about 75 pounds per square inch absolute (PSIA) (approx. 3879 Torr) is desirable, in order to avoid having the dry ice pellets melt into a liquid. Typically, as the contents of the tank are stored for longer periods of time, pressures within the tank will increase as the dry ice sublimates or the liquid nitrogen evaporates. To facilitate maintaining pressures in the desirable ranges, the tank 110, 210 can be equipped with a pressure relief valve.

In embodiments where the dry ice is combined with liquid nitrogen, it is advantageously possible to pressurize the tank 110, 120 to pressures well above 75 PSIA, because the liquid nitrogen cools the dry ice to a temperature well below its melting or sublimation points. Pressures as high as 350 PSIA are readily obtainable using a mixture of dry ice and liquid nitrogen. This greatly facilitates extracting the dry ice from the tank 110 120, using propellants or suction forces as discussed below.

Figure 3A:
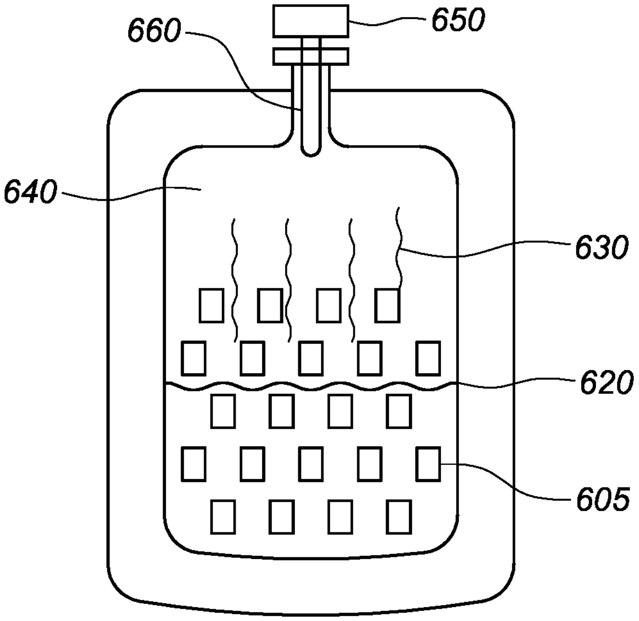
FIGS. 3A and 3B are depictions of the tank of FIG. 1, containing mixtures of cold solid material and a cryogenic liquid, according to exemplary embodiments.
Figure 3B:
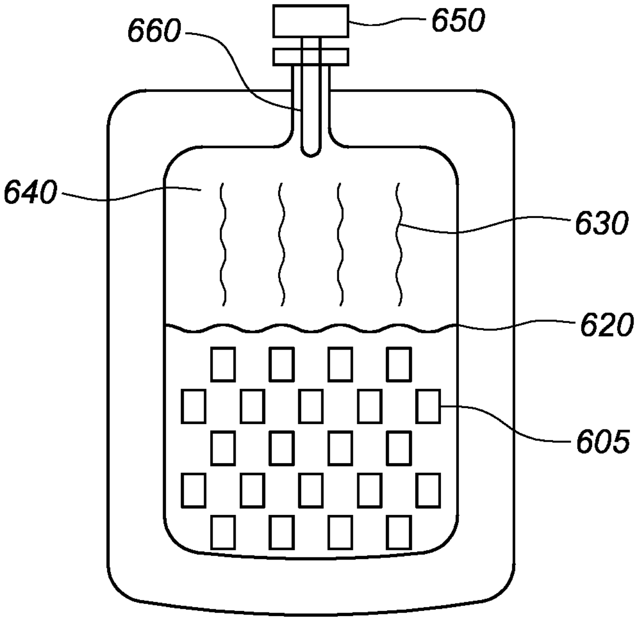

It can also be desirable to maintain the storage space 310 substantially, or completely, free from moisture (i.e., water), including by keeping any moisture-bearing air out of the storage space 310. One configuration that realizes this benefit is to store the dry ice submerged in liquid nitrogen as discussed above. In embodiments, the storage space 310 is completely filled with liquid nitrogen (other than the volume taken up by the dry ice), such that there is no space in the take for air or other potentially moisture-bearing gasses to form. In alternative embodiments, as shown in FIG. 3A, sufficient liquid nitrogen is used to submerge the dry ice beneath the surface of the liquid nitrogen, but there is a region 640 above the surface of the liquid nitrogen. In further alternative embodiments, as shown in FIG. 3B, the dry ice 605 is only partially submerged in liquid nitrogen. In embodiments applying partial submersion a temperature gradient 630 will be created inside the tank 110, 210, with colder temperatures at and below the liquid nitrogen layer surface 620 and warmer temperatures further away from the surface 620 of the liquid nitrogen. In these embodiments, sufficient liquid nitrogen is used to maintain the highest temperature point inside the tank at below the sublimation temperature of the dry ice (i.e. −109 degrees Fahrenheit). Alternatively, it may only be necessary to keep the highest temperature point at a location within the tank that contains dry ice at a point below the sublimation temperature. That is, those locations inside the tank that do not contain any dry ice (e.g. region 640 near the top of the tank 110, 210) need not be preserved below the sublimation temperature. This may allow for use of less liquid nitrogen within the tank 110, 210.

As storage times increase, the liquid nitrogen will slowly evaporate to gaseous nitrogen, which will tend to collect at the top of the tank (i.e. the region 640). The cold finger 660 of a conventional pulse tube or Sterling cryocooler 650 can be located in the region 640 of the tank, to cool the gaseous nitrogen back to a liquid state. Alternatively, the gaseous nitrogen can be extracted from the tank, for example via the pressure relief valve discussed above, cooled back to a liquid state, for example using a cryocooler located outside the tank, and then deposited back into the tank. Alternatively, additional liquid nitrogen can be periodically added to the tank to restore the desired level of liquid nitrogen. A cryocooler is particularly useful when the tank 110, 120 is situated in remote locations, or other situations where it is impractical to periodically add liquid nitrogen to the tank.

In embodiments of the invention, the mixture of dry ice and liquid nitrogen is created simply by adding liquid nitrogen to standard dry ice pellets. In other embodiments of the invention, fine sized particles of dry ice are first created, for example by grinding dry ice pellets up into a fine powder or dust consistency. These particles are then mixed with liquid nitrogen to create a slurry of liquid nitrogen with fine particles of dry ice embedded within. Additionally, fine particles of dry ice can be created by expelling gaseous carbon dioxide into a volume of liquid nitrogen, creating small crystals of dry ice suspended within the volume of liquid nitrogen.

In embodiments of the invention, the volume of the storage space 310 can be allocated for storage purposes up to about 75% dry ice, and 25% liquid nitrogen. This ratio will allow for maximizing the volume of dry ice stored per unit volume of the storage space 310, while maintaining the dry ice cold enough to substantially prevent the pellets from sticking together. Embodiments of the invention where the dry ice pellets are non-uniform in size are also contemplated. In such embodiments, storage ratios up to about 90% dry ice are possible, because the smaller-sized pellets will more substantially fill the spaces between the larger-sized pellets stored in the storage space 310. When extracting the dry ice pellets from the storage space 310, as discussed in further detail below, additional liquid nitrogen can be applied, both to break up any of the pellets that began to adhere to each other, as well as to create a more efficient conveyance medium to pump the dry ice pellets out of the storage space 310. For example, a ratio of liquid nitrogen to dry ice of about 70-80% liquid nitrogen and 20-30% dry ice can be used when conveying the pellets out of the storage space 310.

In embodiments of the invention, a similarly efficient conveyance medium can be created, without requiring a high nitrogen/dry ice ratio, by including an inline solid/liquid separator in the conveyance system downstream of the tank. For example such a separator can be included in the flexible hose 150, the piping 160, or otherwise coupled inline with the delivery path from the tank 110, 210. Alternatively, the separation can be done within the confines of the tank 110, 210, for example by using a separator installed in the port 320 or further inside the tank, or using a mechanical strainer to extract the dry ice pellets from within the liquid nitrogen layer. This has the advantage of separating the liquid nitrogen in a cold environment, which would reduce the amount of liquid nitrogen lost by evaporation. The separator separates the liquid nitrogen from the dry ice. A return pipe or hose connects from the separator back to the tank 110, 210, to return separated liquid nitrogen back into the tank.

As discussed with respect to FIG. 3, in embodiments where the dry ice pellets are stored in a partially-submerged mixture with liquid nitrogen, the non-submerged dry ice pellets 610, particularly those pellets 610 furthest from the surface of the liquid nitrogen layer 620 in the storage space 310, may begin to stick to each other. This same effect occurs in embodiments where no liquid nitrogen is used in storing the dry ice pellets. In either situation, application of liquid nitrogen to these dry ice pellets prior to conveyance of the dry ice pellets out of the storage space 310 will break up the pellets and substantially free them from sticking to each other. Once this additional liquid nitrogen is applied to the stored dry ice pellets and the pellets are broken apart, the pellets can be efficiently egressed, as discussed below.

Storing dry ice in a mixture with liquid nitrogen (or another suitable cryogenic liquid such as liquid argon or helium) is beneficial for certain uses of this mixture, particularly in fighting fires. In addition to the benefits of preventing the dry ice pellets from sticking to each other, as discussed above, the liquid nitrogen also keeps the dry ice pellets much colder than the pellets would be by themselves. Liquid nitrogen cools the dry ice down to −321 degrees Fahrenheit, so the dry ice has to warm up over 200 degrees before it will sublimate to a gas. Absorbing heat is a useful feature for fire suppression. Additionally, the longer the dry ice pellets stay in pellet form and do not sublimate, the less gaseous carbon dioxide is formed in undesirable locations. Keeping the dry ice pellets extremely cold allows the pellets to be expelled from the tank 110, 210 onto the fire, for example using the conveyance systems discussed below. Then, the dry ice pellets absorb heat from the fire, and sublimate and displace oxygen within the fire. This effect starves the fire of heat and oxygen, further enhancing fire suppression capabilities. The liquid nitrogen also beneficially absorbs heat and displaces oxygen in such fires.

Additionally, storing dry ice at temperatures as lows as −321 degrees Fahrenheit makes the dry ice pellets brittle. Brittle pellets are also beneficial to fighting fires, because such pellets break up or shatter on impact with the fire environment. This creates additional surface area (as compared with an unbroken dry ice pellet) which speeds up both the heat absorption and sublimation effects of the dry ice. Yet another benefit to using colder dry ice is that less dry ice is needed to extinguish the fire. Since carbon dioxide at high concentrations is harmful or even fatal to human life, the less carbon dioxide needed to extinguish the fire, the safer the firefighting environment is for humans, including both the firefighting personnel and any other potential victims or other persons located within the fire environment. This is particularly significant when fighting fires in confined spaces such as interior locations, or vehicles such as aircraft.

With storage tanks such as the tanks 110, 210 of embodiments of the invention, as described above, it is possible to store dry ice in an environment that substantially mitigates heat exchange with the outside environment. Almost all of the heat exchange in tanks 110, 210 is through the port 320, where the storage space 310 contacts the outer wall 335 for support. With the horizontal tank 210, there is an additional point of heat exchange where the support 350 and the detents 360 form a connection between the inner wall 315 and the outer wall 335. Vertical tanks may also include a similar detent feature to prevent the inner wall 315 from contacting the outer wall 335 in undesirable manners. However, as will be discussed in further detail below there are other advantages to a horizontal tank configuration that facilitate conveyance of the contents of the storage space 310 out to the external environment.

Figure 4:
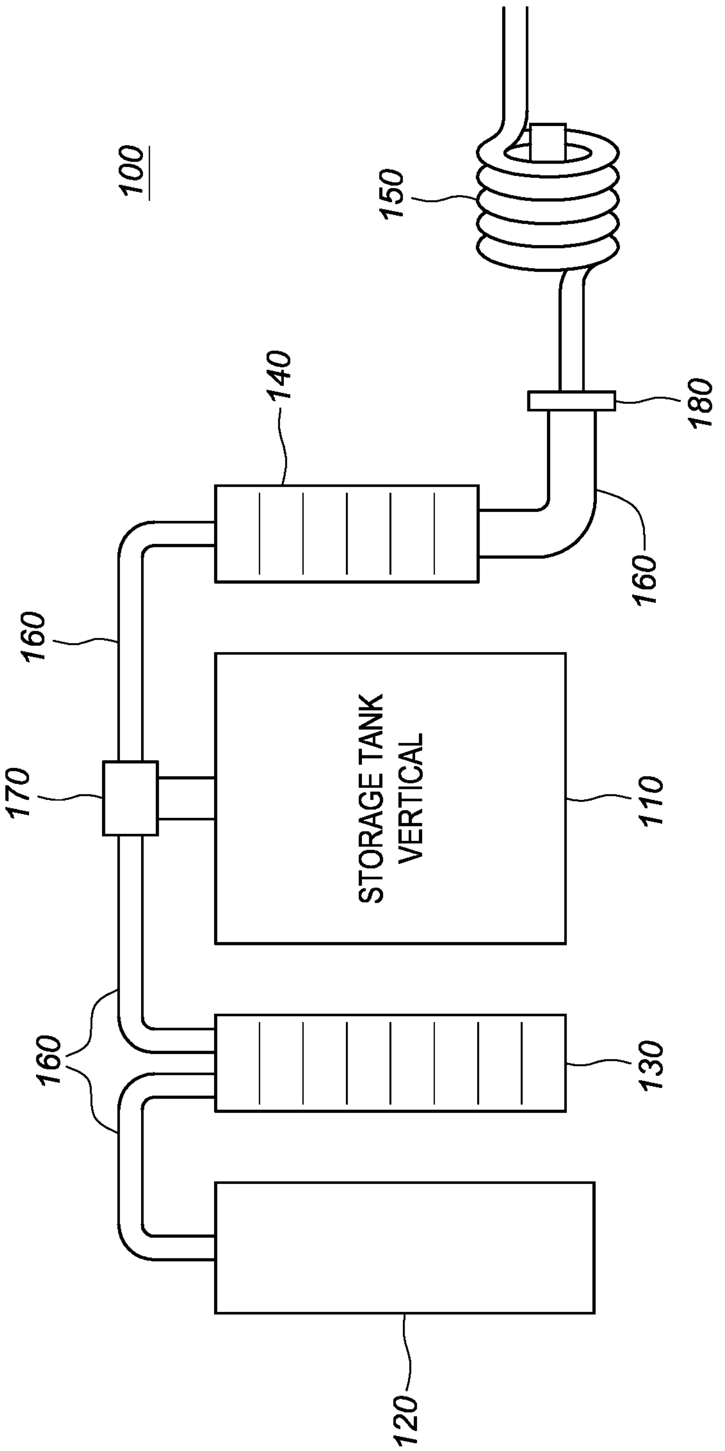
FIG. 4 is a block diagram illustrating an exemplary embodiment of a cold material storage and conveyance system.

The tanks 110, 210 of embodiments of the invention can be used in systems to convey the dry ice and nitrogen mixture out of the tank for a variety of useful purposes, such as expelling the contents onto a fire, to extinguish it. As shown in an embodiment in FIG. 4, the cold storage tank is configured in a vertical configuration, with the port at the top of the tank 110. The system 100 further comprises a gas/liquid delivery sub-system, comprising a compressed gas or liquid storage tank 120, and if the tank 120 is a liquid storage tank a vaporizer 130, coupled together by piping 160. The gas/liquid delivery system provides a gas or liquid propellant, used to extract and convey the dry ice to the location of desired use (e.g., a fire to be extinguished, or a spill or flood to be contained, or a surface to be blasted). In an embodiment, the propellant can be additional liquid nitrogen. This propellant is particularly useful in the fire-fighting context because it contains no undesirable oxygen, and it also delivers additional low-temperature material onto the fire, further enhancing the fire-fighting capabilities of the system. The system 100 further comprises an impact grinder 140, and a flexible hose or other delivery mechanism 150.

Using a mixture of dry ice and liquid nitrogen is also useful in spill cleanups, particularly of materials such as petroleum or other fuels, which freeze more readily at the lower temperatures provided by the liquid nitrogen. Another area where use of ultracold dry ice is useful is in dry ice blasting. Blasting with dry ice is more effective where there is a difference in temperature between the dry ice and the surface to be blasted. Using ultracold dry ice, such as that frozen by liquid nitrogen, further improves the blasting properties of the dry ice. Additionally, using ultracold dry ice in fire suppression would allow the dry ice to last longer in solid form and to absorb more heat from the fire because it starts out colder.

In an embodiment, the storage tank 120 is coupled to an eductor 170. This eductor 170 is coupled to the gas/liquid delivery system via piping 160. This eductor 170 is further coupled to the impact grinder 140 by additional piping 160. The impact grinder 140 is coupled to the flexible hose 150 by additional piping 160, and a coupling 180. In alternate embodiments, an eductor 170 is not used, and the storage tank 120 is connected directly to the tank 110, 210 via piping 160 and the port 320, or via a second port (not shown), for example located at the end of the tank 110, 210 opposite the port 320. In such embodiments, the propellant is expelled from tank 120 through piping 160 into tank 110, 210, causing the contents of the tank 110, 210 to be expelled through port 320, as discussed in further detail below.

In operation, the gas or liquid propellant in storage tank 120 is caused to be expelled out of the tank 120, through piping 160. If the propellant is a liquid, it is expelled into vaporizer 130. Gas propellants need not be vaporized. The propellant can be expelled in a number of different ways. Where the propellant is stored under pressure, this pressure when released causes the propellant to be expelled. For example, a valve at an egress point of the tank can be opened, causing the pressurized contents to be expelled. Alternatively, a pump may be used to pump the propellant from the tank into piping 160. In the vaporizer 130, a liquid propellant is vaporized and passed out of the vaporizer 130 through piping 160, towards eductor 170. At the valve, the propellant is combined with dry ice from storage tank 110, 210. The dry ice in storage tank 110, 210 can be removed from the tank 110, 210 by a variety of methods.

For example, as discussed in further detail below, a screw conveyer can be used to extract the dry ice from the tank. This screw conveyer can be inserted into the tank when conveyance is desired, or a screw conveyer can be inserted into the tank prior to loading the tank with dry ice. In embodiments, the conveyer can conform to the inner wall 315 of the tank. In other embodiments, the screw conveyer can be located within the piping 160 connected to the port 320, with an end of the conveyer extending partially into the tank 110, 210. In such embodiments, the tank is preferably pressurized, such that the pressure force encourages the dry ice to travel towards the piping 160 containing the screw conveyer. The screw conveyer then assists with extraction of the dry ice from the tank.

In yet further embodiments, the dry ice can be extracted from the tank by applying pressure using a propellant, as discussed further herein. This propellant can be a hydraulic propellant such as liquid nitrogen, or it can be a pneumatic propellant such as nitrogen gas or air. Where air is used as the propellant, it is advantageously dried of moisture before being used as a propellant. For example, the air can be cooled to a temperature that extracts substantially all of the moisture from the air.

Once the dry ice and propellant are combined at eductor 170, or expelled from tank 110, 120 where an eductor is not used, the mixture proceeds through piping 160 to impact grinder 140. The impact grinder 140 grinds the dry ice pellets into the final desired size for the desired application, from full size pellets down to dry ice snow or dust. In an embodiment, the full sized pellets have a largest dimension of about 4 to 6 inches. These pellets can be spherical, cylindrical or any other desired shape. The ground up dry ice is then carried by the propellant through piping 160, into flexible hose 150. Once the dry ice and propellant mixture is inside flexible hose 150, this mixture is further expelled through the hose 150 until it is delivered to the point of need, such as a fire, hazardous material spill location, or flood water location. In alternate embodiments where larger-sized pellets are desired, or where smaller-sized pellets or dry ice snow or dust are stored initially, the impact grinder 140 can be omitted. For example, in dry ice blasting configurations, it may be desirable to use pellets without further reducing them in size. In a further alternative embodiments, the dry ice pellets can be ground to the desired size before they are extracted from the tank 110, 120, or immediately after they are extracted. In any of these embodiments, because the dry ice pellets are more brittle due to the lowered temperatures caused by the liquid nitrogen, the pellets are more easily ground to the desired size. This can be particularly beneficial in embodiments where the grinder is located inline within the piping 160, or at other points where the flow of the pellets is restricted.

Figure 5:
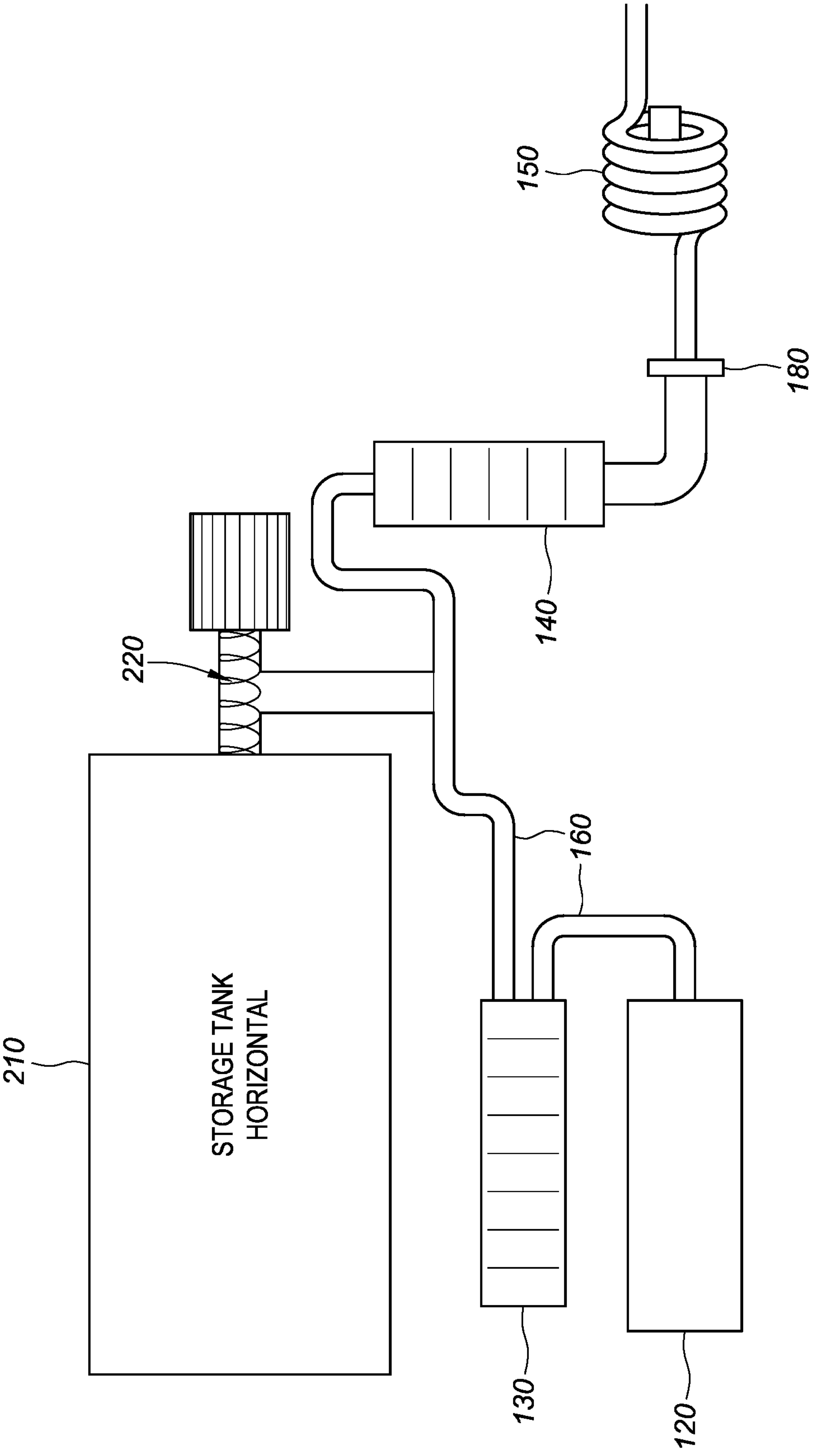
FIG. 5 is a block diagram illustrating another exemplary embodiment of a cold material storage and conveyance system.

Turning now to FIG. 5, a storage and conveyance system 200 of another embodiment of the invention shares a number of similar components with the system 100 discussed above. The system 200 can comprise a cold storage tank 210 that contains dry ice. In system 200, the cold storage tank 210 is arranged in a horizontal configuration, with the port at the side of the tank 210. The system 200 otherwise uses the same gas/liquid storage tank 120, vaporizer 130, impact grinder 140 and flexible hose 150 as the system 100. The storage tank 120 is coupled to the vaporizer 130 by piping 160. The vaporizer 130 is coupled to the storage tank 210 and impact grinder 140 by additional piping 160. The impact grinder is coupled to the flexible hose 150 by additional piping 160 and a coupling 180.

Because the storage tank 210 is horizontal and the force of gravity is reduced, it is possible to use a screw conveyer 220 to extract the dry ice pellets from the tank 210. The screw conveyer 220 uses a screw that rotates inside the tank 210. The dry ice pellets are picked up in the blade of the screw, and caused to move towards the port in the tank 210 by rotating the screw in the proper direction, for example clockwise about a screw axis. This screw conveyer 220 can also be used to load dry ice pellets into the tank 210, by operating the screw in the opposite direction (e.g. counter-clockwise), causing the blade of the screw to move the dry ice pellets into the tank 210. A screw conveyer could be used in the vertical configuration of tank 110 as well, if for example the screw surfaces of the conveyer were configured with a gripping mechanism, such as a roughened surface, or a collection of small detents or spikes that are effective to grip the surface of the dry ice pellets and defeat the pull of gravity.

The operation of the system 200 is largely similar to that of the system 100. However, instead of mixing the propellant and the dry ice pellets at eductor 170, the dry ice pellets are extracted from the tank 210 by the screw conveyer 220 and deposited into the propellant contained in piping 160, for example by the force of gravity.

In embodiments of the invention, the gas/liquid tank 120 is a conventional pressure vessel, configured to store gasses or liquids under pressure and allow those contents to egress the tank under pressure, when a configurable opening such as a valve is released. In embodiments of the invention, the vaporizer 130 is a conventional vaporizer, configured to vaporize liquids. In embodiments using a gas as the propellant, the vaporizer is omitted, or optionally replaced by a gas warmer. The vaporizer or the gas warmer are provided to increase the flow rate that the system can provide. This can be desirable where the flow rate provided by the liquid or gas venting at its own pressure is insufficient. In embodiments of the invention, the impact grinder 140 is a conventional impact grinder, configured to receive solid materials and grind them into smaller-sized particles. The impact grinder 140 is configurable, to control the size of the particles created, ranging from full sized pellets (i.e. no grinding) down to a fine snow or dust of the dry ice or other substance stored in the tank 110, 210. In embodiments of the invention, the flexible hose 150 is a conventional flexible hose, capable of conveying cold materials in a safe and efficient manner. This flexible hose 150 can be, for example, a heavy wall convoluted PTFE hose, such as those available from Parker Hannifin Corp. of Cleveland, OH. Any material that can remain flexible at temperatures of −109 F and withstand the pressures introduced by the propellant stored in tank 120 would be suitable. For other embodiments, including embodiments where liquid nitrogen is used and the ultra-low temperature would make it difficult to keep any hose flexible, any hose or pipe that is capable of withstanding the pressures introduced by the propellant would be suitable. For example an insulated metal or plastic pipe, or the same hose as discussed above. In embodiments of the invention, piping 160 is conventional insulated piping, configured to convey materials under the pressures introduced by the propellant stored in tank 120. This piping 160 is covered by an insulating material, such as foam or a vacuum jacket. This piping 160 can be rigid material, such as stainless steel or it can be flexible materials such as PTFE. In embodiments of the invention, the eductor 170 is a device that feeds the solid material stored in tank 110, 210 into the piping 160, using the gas or liquid propellant from tank 120. The eductor 170 beneficially facilitates the flow of the solid material and propellant mixture, without any additional moving parts. This enhances reliability of the system and reduced maintenance costs. Eductors suitable for use with embodiments of the invention, such as Venturi eductors, are available from Fox Venturi Products of Dover, NJ.

Using the systems and methods disclosed in embodiments herein, long term storage of cold solid materials such as dry ice is possible. These systems have been found to preserve dry ice at a loss rate of 1% per day or less, in embodiments where dry ice alone is stored in the tanks 110, 210. In systems using liquid nitrogen, the system will preserve the dry ice at substantially zero loss rate, until the liquid nitrogen substantially evaporates away (or at least until sufficient liquid nitrogen evaporates away that the system is unable to maintain the interior temperature below the boiling point of liquid nitrogen). In such systems, the liquid nitrogen loss rate is also at or below 1% per day. Such systems and methods allow for more reliable distribution and storage of dry ice than available using conventional systems and methods, and permit dry ice to be kept available for on-demand use for extended periods of time. In embodiments of the invention where liquid nitrogen is used and recycled, dry ice can be stored indefinitely.

Accordingly, persons of ordinary skill in the art will understand that, although particular embodiments have been illustrated and described, the principles described herein can be applied to different types of cold storage systems. Certain embodiments have been described for the purpose of simplifying the description, and it will be understood to persons skilled in the art that this is illustrative only. Accordingly, while this specification highlights particular implementation details, these should not be construed as limitations on the scope of any invention or of what may be claimed, but rather as descriptions of features that may be specific to particular embodiments of particular inventions.

What is claimed is:

1. A cold material storage tank, comprising:

an inner wall defining a storage region containing a plurality of pieces of solid material;

an outer wall substantially surrounding said inner wall, the inner wall and outer wall together forming an interior space therebetween, the interior space comprising a low-pressure region;

a port formed in the inner wall and the outer wall, the port defining an opening in the inner wall and the outer wall, the port configured to permit the ingress and egress of the plurality of pieces of solid material, the port coupling the inner wall to the outer wall;

a support attached to the outer wall, within the interior space, at a location that is diametrically opposite the port, the support being engaged with a plurality of dents that are formed on the inner wall inside the interior space;

a plurality of protrusions extending partially inward from the inner wall into the storage space, said plurality of protrusions being pitched towards the port in the form of a spiral;

a cooler disposed adjacent the port outside the storage region, the cooler including a cold finger inserted into the port towards the storage region, and wherein the storage region contains the plurality of pieces of the solid material continuously submerged within a cryogenic liquid, and said plurality of pieces are not agitated until being removed from the storage region via the port.

2. The tank of claim 1, wherein the plurality of pieces of the solid material comprise dry ice.

3. The tank of claim 1, wherein the cryogenic liquid comprises liquid nitrogen.

* * * * *